United States Patent
Yasugi

(10) Patent No.: US 8,508,061 B2
(45) Date of Patent: Aug. 13, 2013

(54) WIND-POWER GENERATION SYSTEM AND CONTROL METHOD FOR THE SAME

(75) Inventor: Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/357,172

(22) Filed: Jan. 24, 2012

(65) Prior Publication Data

US 2013/0119660 A1    May 16, 2013

Related U.S. Application Data

(63) Continuation of application No. PCT/JP2011/076383, filed on Nov. 16, 2011.

(51) Int. Cl.
*F03D 9/00* (2006.01)
*H02P 9/04* (2006.01)

(52) U.S. Cl.
USPC ............................................. 290/44

(58) Field of Classification Search
USPC .................................................. 290/44, 55
See application file for complete search history.

(56) References Cited

U.S. PATENT DOCUMENTS

| 7,281,891 B2 | 10/2007 | Smith et al. | |
|---|---|---|---|
| 2010/0213712 A1* | 8/2010 | Arinaga et al. | 290/44 |
| 2012/0035774 A1* | 2/2012 | Yasugi | 700/287 |

FOREIGN PATENT DOCUMENTS

| EP | 2 218 910 A1 * | 8/2010 |
|---|---|---|
| EP | 2 221 957 A1 * | 8/2010 |
| JP | 2001-234845 A | 8/2001 |
| JP | 2002-349413 A | 12/2002 |
| JP | 2006-022792 A | 1/2006 |
| WO | 2010/125687 A1 * | 11/2010 |

OTHER PUBLICATIONS

Machine translation of JP 2001-234845. Jun. 14, 2012.*
Machine translation of JP 2002-349413. Jun. 14, 2012.*
Machine translation of JP 2006-022792. Jun. 14, 2012.*

* cited by examiner

*Primary Examiner* — Javaid Nasri
(74) *Attorney, Agent, or Firm* — Manabu Kanesaka; Kenneth M. Berner; Benjamin J. Hauptman

(57) ABSTRACT

An object is to reduce a decrease in the amount of electric power supplied due to the occurrence of a gust of wind during an output-power limiting operation. Provided is a wind-power generation system in which, in the case where an output-power limiting operation for decreasing the grid frequency is performed, when at least one wind turbine is disconnected depending on the wind conditions, the output power of the other wind turbines in operation is increased.

13 Claims, 4 Drawing Sheets

WIND-POWER GENERATION SYSTEM AND CONTROL METHOD FOR THE SAME

CROSS REFERENCE TO RELATED APPLICATIONS

This application is a continuation application of PCT/JP2011/076383 filed on Nov. 16, 2011, the contents of which is hereby incorporated by its reference.

BACKGROUND OF THE INVENTION

1. Field of the Invention

The present invention relates to a wind-power generation system and a control method for the same.

2. Description of Related Art

In recent years, when the grid frequency has become higher than the rated frequency, an output-power limiting operation for limiting the output power of wind turbines is sometimes performed irrespective of the wind speed to decrease the frequency. During the output-power limiting operation, the output power is reduced, and the rotational speed becomes higher than that in a normal operation. This causes overspeeding if a gust of wind occurs during the output-power limiting operation, thus increasing the possibility of disconnection.

PATENT LITERATURE

U.S. Pat. No. 7,281,891

When a wind turbine is disconnected, electric power supplied to the utility grid is reduced. On the other hand, performing control for increasing the output power and decreasing the rotational speed to avoid disconnection tends to increase the grid frequency, thus impeding stable operation of the utility grid.

BRIEF SUMMARY OF THE INVENTION

An object of the present invention is to provide a wind-power generation system that is capable of supplying stable power to a utility grid even if a wind turbine is disconnected due to the wind conditions during an output-power limiting operation, and a control method for the same.

A first aspect of the present invention is a wind-power generation system including a plurality of wind turbines, in which the output power of the individual wind turbines is supplied to a utility grid through a common interconnection point, wherein in the case where an output-power limiting operation for decreasing the grid frequency is performed, when at least one of the wind turbines is disconnected depending on wind conditions, the output power of the other wind turbines in operation is increased.

A second aspect of the present invention is a control method for a wind-power generation system including a plurality of wind turbines, in which the output power of the individual wind turbines is supplied to a utility grid through a common interconnection point, wherein in the case where an output-power limiting operation for decreasing the grid frequency is performed, when at least one of the wind turbines is disconnected depending on wind conditions, the output power of the other wind turbines in operation is increased.

The present invention provides an advantage in that it is possible to supply stable power to a utility grid even if a wind turbine is disconnected due to the wind conditions during an output-power limiting operation.

DETAILED DESCRIPTION OF THE INVENTION

Hereinafter, a wind-power generation system and a control method for the same according to an embodiment of the present invention will be described with reference to the drawings.

Figure 1:
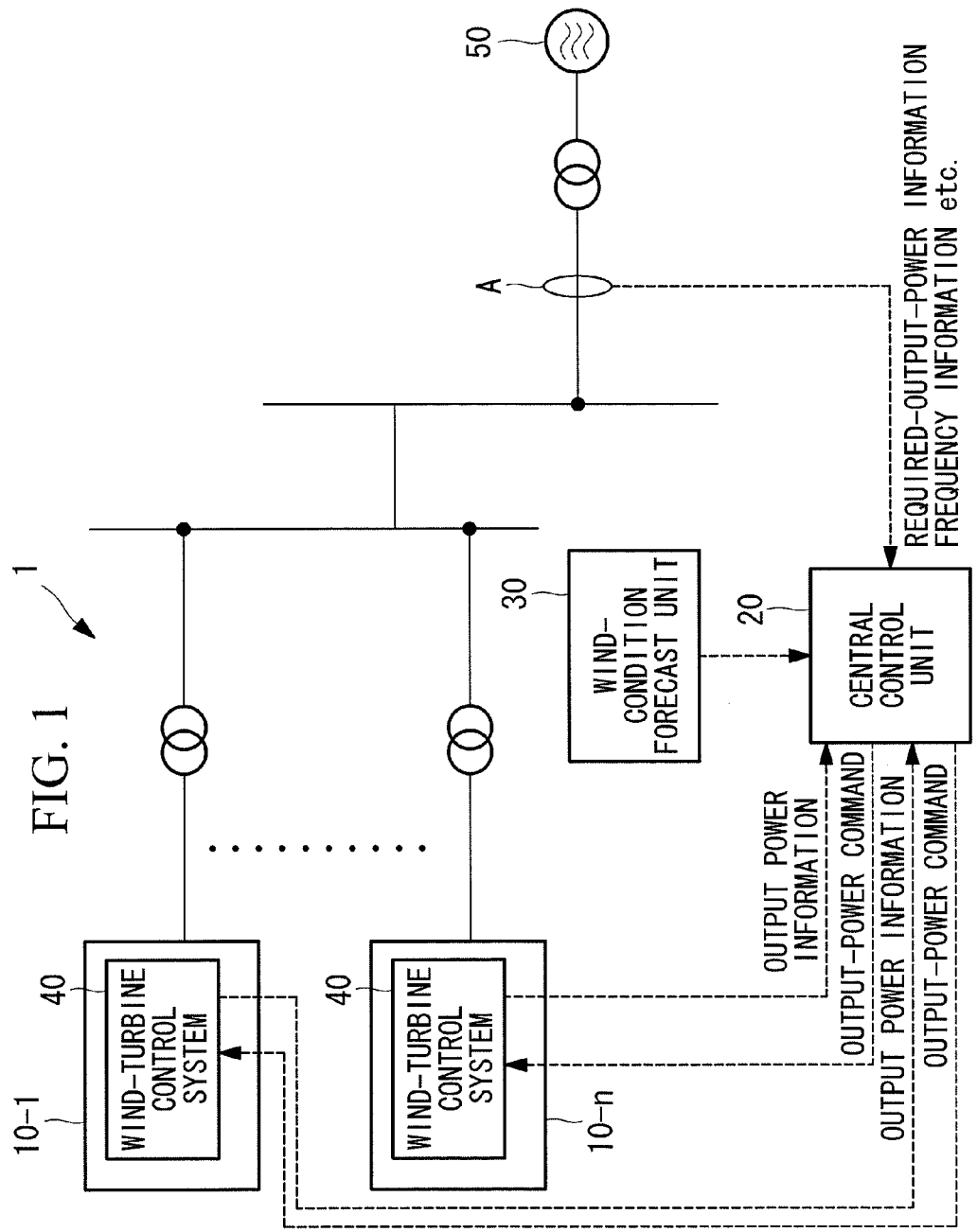
FIG. 1 is a diagram showing the overall configuration of a wind-power generation system according to an embodiment of the present invention.

FIG. 1 is a diagram showing the overall configuration of the wind-power generation system according to this embodiment. As shown in FIG. 1, a wind-power generation system 1 includes a plurality of wind turbines 10-1, ..., 10-n (hereinafter, when all of the wind turbines are shown, reference sign "10" is simply applied, and when the individual wind turbines are shown, signs "10-1", "10-n", and so on are applied), a central control unit (central control means) 20 that gives an output-power command to the individual wind turbines 10, and a wind-condition forecast unit (wind-condition forecast means) 30 that forecasts wind conditions. In this embodiment, all of the wind turbines 10 are variable-speed wind turbines whose rotational speeds can be controlled depending on the wind speed.

Electric power output from the individual wind turbines 10 is supplied to a utility grid 50 through individual power lines via a common interconnection point.

The central control unit 20 generates output-power commands for the individual wind turbines 10-1, ..., 10-n on the basis of information regarding the required output power, frequency, etc. at the interconnection point A, which is sent from a power management room (for example, power company) that manages the electric power of the utility grid 50, so that the output power at the interconnection point A reaches a target electric power, and transmits the output-power commands to the individual wind turbines 10-1, ..., 10-n. Thus, the individual wind turbines 10-1, ..., 10-n control the output voltage and the output current on the basis of the output-power commands given thereto from the central control unit 20.

An example of the wind-condition forecast unit 30 is a LIDAR system, which forecasts wind conditions, such as the wind speed and wind direction, in the near future (for example, a few minutes later) at the site where the wind turbines 10 are installed and outputs the forecast results to the central control unit 20.

Figure 2:
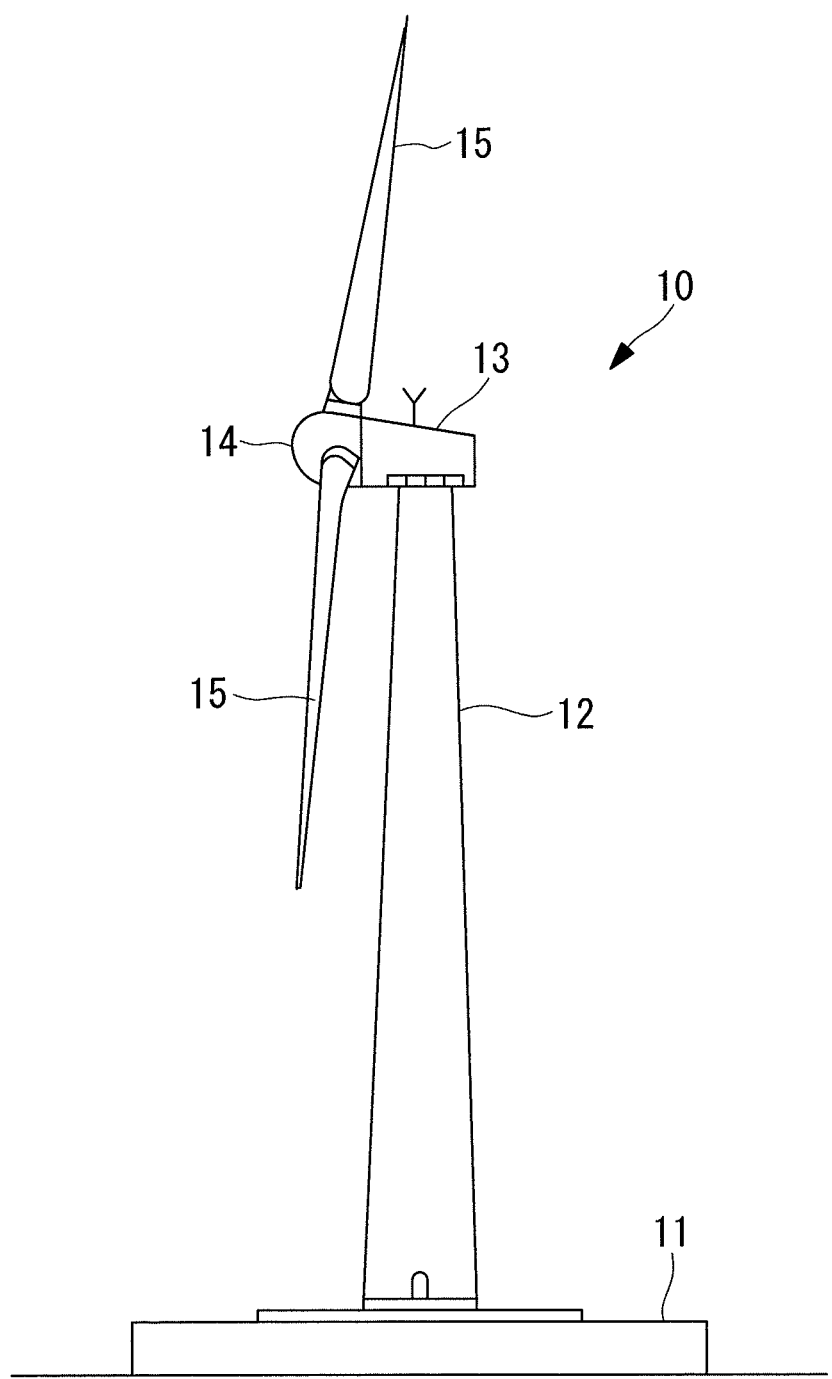
FIG. 2 is an external view of a wind turbine.
Figure 3:
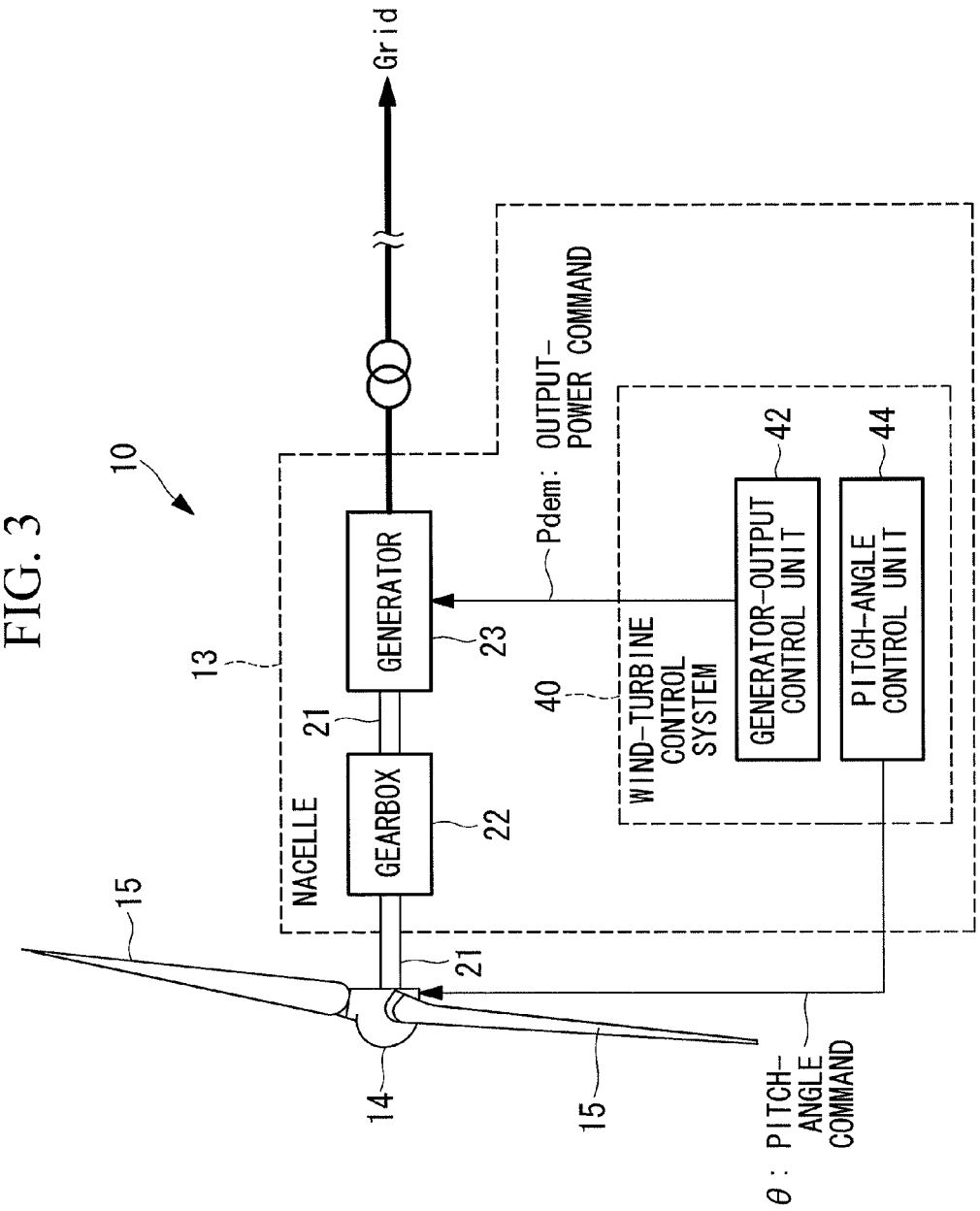
FIG. 3 is a schematic diagram showing the electrical configuration of the wind turbine.

FIG. 2 is an external view of the wind turbine 10, and FIG. 3 is a schematic diagram showing the electrical configuration of the wind turbine 10.

As shown in FIG. 2, the wind turbine 10 includes a tower 12 that is vertically erected on a foundation 11, a nacelle 13 mounted at the upper end of the tower 12, and a rotor head 14 mounted on the nacelle 13 so as to be rotatable about a substantially horizontal axis.

The rotor head 14 has a plurality of (in this embodiment, for example, three) blades 15 mounted in a radial pattern about its rotation axis. The blades 15, the pitch angle of which is changeable, are connected to the rotor head 14 so as to be rotatable depending on the operating conditions.

As shown in FIG. 3, a gearbox 22 and a generator 23 are mechanically joined to the rotating shaft 21 of the rotor head 14. The generator 23 may be either a synchronous generator or an induction generator.

The rotor head 14 is rotated about the rotating shaft due to the force of wind blowing against the blades 15 from the direction of the rotation axis of the rotor head 14, and the rotational force is increased by the gearbox 22 and is transmitted to the generator 23, where it is converted to electric power.

The output power of the generator 23 is controlled by a wind-turbine control system 40 installed in the nacelle.

The wind-turbine control system 40 includes a generator-output-power control unit 42 and a pitch-angle control unit 44.

The generator-output-power control unit 42 generates an output-power command Pdem for controlling the output power of the generator 23 on the basis of an output-power command received from the central control unit 20 and transmits it to the generator 23. For example, the output-power command Pdem is determined on the basis of an output request from the central control unit 20, the present output power of the generator 23, the rotational speed of the rotor head 14, the pitch angle of the blades 15, the wind speed, and so on.

Upon receiving the output-power command Pdem, the generator 23 changes its output power on the basis of the output-power command Pdem.

To control the pitch angle of the blades 15, the pitch-angle control unit 44 generates a pitch-angle command θ and transmits it to a pitch actuator (not shown), installed in the rotor head 14, for changing the pitch angle. The pitch-angle command θ is determined on the basis of the present pitch angle, the speed of wind that the blades 15 receive, the rotational speed of the rotor head 14, etc.

Upon receiving the pitch-angle command θ, the pitch actuator changes the pitch angle of the blades 15 on the basis of the pitch-angle command θ.

In the above-configured wind-power generation system, when the frequency of the utility grid 50 has become higher than the rated frequency, an output-power limiting operation for limiting active power at the interconnection point A is performed to decrease the frequency.

Details of the control executed by the central control unit 20 during a period in which the output-power limiting operation is performed will be described with reference to FIG. 4.

First, when the central control unit 20 is notified of near-future forecast results of the wind direction and wind speed from the wind-condition forecast unit 30 (step SA1 in FIG. 4), the central control unit 20 determines from the forecast results whether a wind speed higher than or equal to a preset first threshold value has been forecasted (step SA2), and if a wind speed higher than or equal to the first threshold value has been forecasted, the central control unit 20 specifies wind turbines that receive wind higher than or equal to the first threshold value (hereinafter referred to as "wind turbines of group A" for convenience of explanation) (step SA3). If a wind speed higher than or equal to the first threshold value has not been forecasted, the process moves to step SA5.

In this embodiment, the first threshold value is set to a cut-out wind speed. Here, the cut-out wind speed is a speed at which a torque that acts on the main shaft 21 due to the wind reaches a limit value at which the equipment (main shaft 21, gearbox 22, etc.) may be damaged.

Examples of a method for specifying wind turbines of group A are as follows.

Method 1

The central control unit 20 has first information in which wind speeds and wind directions and wind turbine groups (also including one wind turbine) to be disconnected are associated with each other, and if a wind speed higher than or equal to the first threshold value is forecasted by the wind-condition forecast unit 30, the central control unit 20 acquires a wind turbine group corresponding to the forecasted wind speed and wind direction from the first information and determines the acquired wind turbine group as group A.

The first information is created on the basis of, for example, the past wind condition history. For example, the relationships between wind speeds and wind directions and the rotational speeds, loads, etc. of the rotor heads 14 of the individual wind turbines 10-1, . . . , 10-$n$ are accumulated for the past several years, and information on how the rotational speeds, loads, etc. of what wind turbines have changed under what wind conditions is accumulated. As a matter of course, the information reflects also the topological features where the wind farm is installed and so on. The first information in which wind speeds and wind directions and wind turbine groups to be disconnected are associated with each other is created by analyzing the accumulated information.

The first information may be updated at predetermined time intervals in preparation for a case in which an event that causes changes in the wind conditions of that area, for example, a change in geographic features or an increase in the number of wind turbines, has occurred. The first information may be information in which wind directions and wind turbine groups to be disconnected are associated with each other.

Method 2

In the case where the wind-condition forecast unit 30 can create a forecasted distribution of wind speeds and wind directions in two or three dimensions, wind turbines that will receive wind having a wind speed higher than or equal to the first threshold value is specified by comparing the forecasted distribution and the installation locations of the individual wind turbines 10-1, . . . , 10-$n$.

Figure 4:
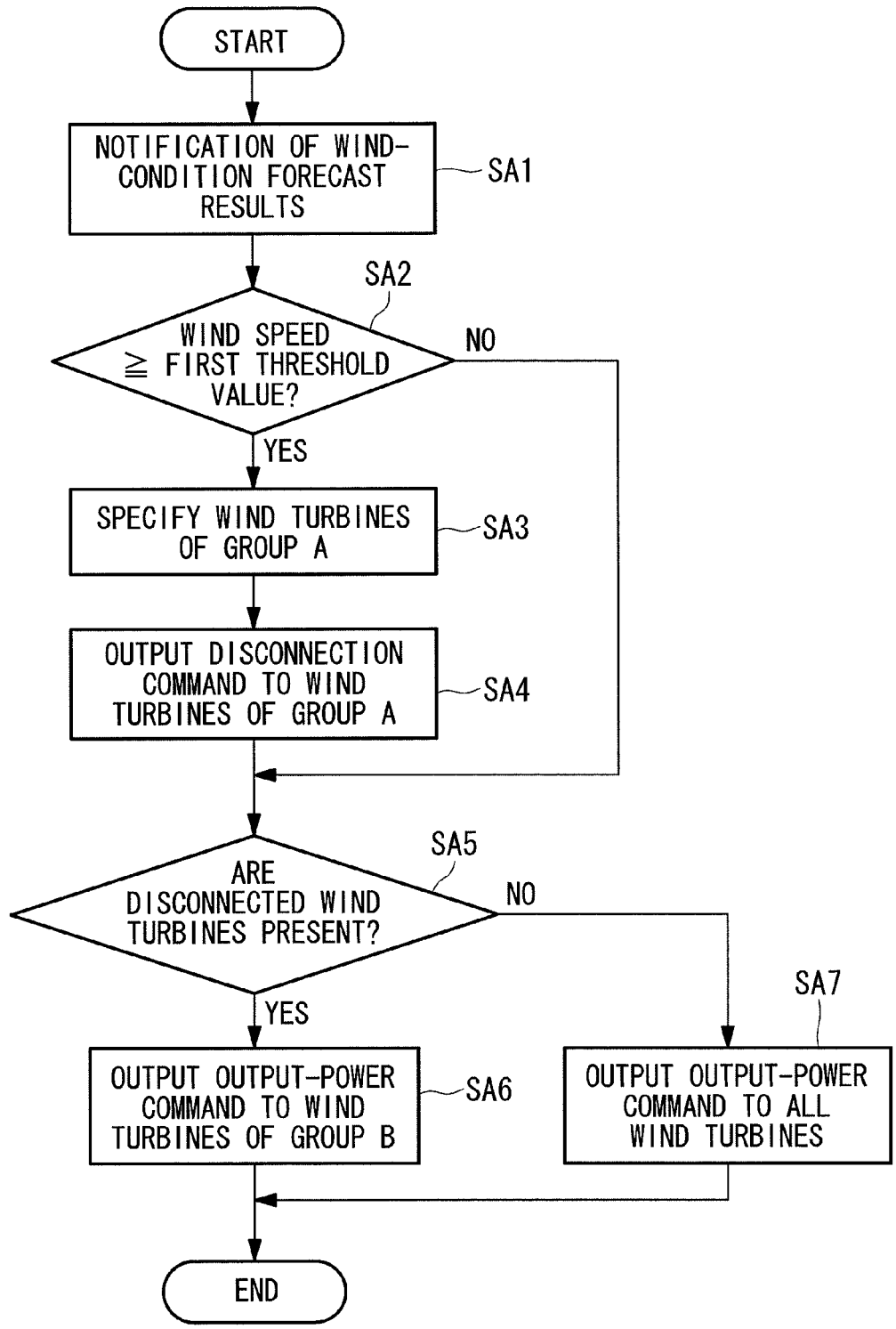
FIG. 4 is a flowchart for explaining a method for controlling the wind-power generation system according to an embodiment of the present invention.

After specifying the wind turbines of group A in this way, the central control unit 20 outputs a disconnection command to the individual specified wind turbines 10 (step SA4 in FIG. 4).

The wind turbines 10 that have received the disconnection command disconnect contactors (not shown) connected to the utility grid 50 and start a control sequence for halting the operation. This allows the individual wind turbines 10 that have received the disconnection command to execute control for feathering the blade pitch angles in accordance with a command from the wind-turbine control system 40 and to be halted in the state in which the pitch angles of the individual blades are feathered.

Here, the wind turbines 10 to be disconnected may either be disconnected all together or be disconnected in sequence one-by-one or a few at a time.

The disconnection of the contactors may either be controlled in accordance with a command from the wind-turbine control system 40, as described above, or may be controlled in accordance with a direct command from the central control unit 20.

Subsequently, the central control unit 20 determines whether wind turbines to which a disconnection command is issued in this processing or wind turbines that have already been disconnected in the previous processing are present (step SA5 in FIG. 4), and if corresponding wind turbines are present, the central control unit 20 calculates a total output power ΣPA, which is decreased due to the disconnection of the wind turbines, allocates the total output power ΣPA to the other wind turbines 10 (hereinafter referred to as "wind turbines of group B" for convenience of explanation) which continue to be operated, creates an output-power command for the individual wind turbines of group B, and transmits it (step SA6 in FIG. 4). The total output power ΣPA may either be evenly allocated or may be allocated on the basis of predetermined weighting.

For example, an output-power command PCB' for the individual wind turbines of group B after disconnection is given by the following Eq. (1):

$$PCB' = \Sigma PA/NB + PCB \quad (1)$$

where NB is the number of wind turbines of group B, and PCB is an output-power command for the wind turbines of group B before disconnection.

Here, the output power reduction of the individual wind turbines due to disconnection may be acquired by receiving output power information directly before the disconnection from the individual wind turbines 10, as shown in FIG. 1. Alternatively, since the central control unit 20 monitors electric power at the interconnection point A, information on the decreased electric power due to the disconnection of the wind turbines of group A may be acquired by calculating an electrical power difference LP at the interconnection point A before and after disconnection.

The transmission of a disconnection command to the individual wind turbines of group A and the transmission of an output-power command to the individual wind turbines of group B may either be performed substantially at the same time, or the output-power command may be transmitted to the individual wind turbines of group B after the disconnection of the wind turbines of group A has been confirmed. The former can reduce the time lag between a decrease in output power due to the wind turbines of group A and an increase in electric power due to the wind turbines of group B, thus allowing a decrease in the electric power of the entire wind-power generation system to be decreased. The latter can reliably avoid a temporary increase in output power due to an increase in the output power of the wind turbines of group B before the disconnection of the wind turbines of group A.

In step SA5, if wind turbines to which a disconnection command is issued in this processing or wind turbines that have already been disconnected in the previous processing are not present, an output-power command for the individual wind turbines 10 is created on the basis of a predetermined algorithm for limiting the output power and is transmitted (step SA7 in FIG. 4).

The central control unit 20 executes the foregoing processing repeatedly at predetermined time intervals.

For example, the central control unit 20 may restore disconnected wind turbines if the average wind speed during a predetermined period after the disconnection of the wind turbines is lower than or equal to a second threshold value that is set to be less than the first threshold value.

At that time, the output power to the wind turbines 10 of group B, which continue to be operated, is decreased in cooperation with the restoring of the wind turbines 10 of group A. For example, since electric power at the interconnection point is increased by restoring the wind turbines, an output-power command for the wind turbines 10 of group B may be determined on the basis of Eq. (1) depending on the increase.

Furthermore, for the timing at which the wind turbines of group A are restored, a wind speed that the disconnected wind turbines 10 receive may be acquired from the forecasted results from the wind-condition forecast unit 30, and if the wind speed is lower than or equal to the second wind speed, the disconnected wind turbines may be restored.

Here, for restoring the wind turbines 10, the disconnected wind turbines may either be restored all together or be restored in sequence one-by-one or in groups of a few wind turbines at a time.

The timing at which the wind turbines are restored may be individually determined on the basis of measurement results from anemometers on the individual wind turbines rather than a command from the central control unit 20.

As described above, with the wind-power generation system and the control method for the same according to this embodiment, in the case where an output-power limiting operation for decreasing the grid frequency is performed, when at least one wind turbine is disconnected depending on the wind conditions, the output power of the other wind turbines in operation is increased, and thus, a decrease in electric power due to the disconnection can be reduced. This allows a stable output power to be supplied even if a gust of wind blows during the output-power limiting operation.

Furthermore, since the wind-condition forecast unit 30 that forecasts wind conditions is provided, and wind turbines that are forecasted to receive wind having a wind speed higher than or equal to the predetermined first threshold value are disconnected on the basis of the result of forecast by the wind-condition forecast unit 30, the wind turbines can be disconnected before a gust of wind actually blows. This allows application of an unnecessary load to be avoided.

Furthermore, since the central control unit 20 that gives a control command to the individual wind turbines is provided, and the central control unit 20 outputs a disconnection command to wind turbines (wind turbines of group A) that are forecasted to receive wind having a wind speed higher than or equal to the first threshold value and outputs an output-power command so as to compensate for an output power reduction due to the disconnection of the wind turbines to the other wind turbines (wind turbines of group B), a change in the amount of electric power supply due to the disconnection of the wind turbines can be reduced.

Since the central control unit 20 has the first information in which wind directions and wind turbine groups to be disconnected are associated with each other, and when a wind speed higher than or equal to the first threshold value is forecasted by the wind-condition forecast unit 30, since the central control unit 20 acquires a wind turbine group corresponding to the direction of the wind from the first information and outputs a disconnection command to the acquired wind turbine group, the wind turbines to be disconnected can easily be specified.

Furthermore, since the first information is updated at predetermined time intervals, the first information can also be applied to, for example, a case where the environment surrounding the wind turbines, such as conditions at the location of the wind turbines, is changed.

In this embodiment, while the first threshold value is set to a cut-out wind speed (for example, 25 m), the first threshold value may be set to a wind speed lower than the cut-out wind speed.

For example, the cut-out wind speed is set with a normal operation, that is, a case where the output-power limiting operation is not performed, as a precondition. Thus, for example, when the output-power limiting operation in which the rotational speed is higher than normal is performed, the wind turbines enter an overspeed state at a wind speed lower than the cut-out wind speed, which may cause trip control.

To avoid such a situation, a wind speed (for example, a wind speed of 20 m) lower than the cut-out wind speed may be set as a wind speed threshold value for disconnection, and when a wind speed higher than the wind speed threshold value is forecasted, wind turbines that will receive the wind having that wind speed may be specified.

Tripping of the wind turbines is executed when the rotational speed of the rotor head 14 has exceeded a predetermined rotational speed threshold value. Accordingly, the first threshold value may be set to a wind speed at which the rotational speed is forecasted to reach a preset upper limit rotational speed on the basis of the pitch angles and the output powers of the individual wind turbines 10. This allows higher accuracy control to be achieved.

For example, the rotational speed depends on the wind speed, output power, and blade pitch angle. Accordingly, a map or function that associates rotational speeds, wind speeds, output powers, and blade pitch angles with each other in advance may be prepared, and a wind speed corresponding to a trip rotational speed may be determined from the map or function, and the wind speed may be set as the first threshold value.

By changing the first threshold value depending on the operating state of the wind turbines and the wind conditions in this way, the wind turbines can be disconnected at more suitable timing.

Although this embodiment has been described as applied to the case where one wind-condition forecast unit 30 is installed, the number of wind-condition forecast units 30 is not limited. For example, one wind-condition forecast unit 30 may be provided in each group of some of the wind turbines that constitute the wind farm, or alternatively, one wind-condition forecast unit 30 may be provided in each of the wind turbines 10. Also when the plurality of wind-condition forecast units 30 are provided, as described above, wind condition forecast results are transmitted from the individual wind-condition forecast units 30 to the central control unit 20.

In this embodiment, the wind conditions of the area in which the wind turbines 10 are installed are forecasted by the wind-condition forecast unit 30; instead, actual wind speeds and wind directions may be measured using anemometers and anemoscopes provided on the individual wind turbines 10, and the wind turbines may be disconnected on the basis of these measured values.

In this embodiment, although all of the wind turbines 10 are assumed to be variable-speed wind turbines, fixed-speed wind turbines whose rotational speed cannot be controlled depending on the wind speed may be used as some of the wind turbines 10. In this case, the stability precision of the output power supply changes depending on whether a wind turbine disconnected depending on the wind conditions is a variable-speed wind turbine or a fixed-speed wind turbine; however, the present invention can also provide an advantage in that the output power reduction when the fixed-speed wind turbine is disconnected can be compensated for by the variable-speed wind turbine.

What is claimed is:

1. A wind-power generation system including a plurality of wind turbines, in which an output power of each of the plurality of wind turbines is supplied to a utility grid through a common interconnection point,
    wherein the wind-power generation system is structured to operate in a normal operation and an output-power limiting operation in which a rotational speed of each of the plurality of wind turbines is higher than that in the normal operation, and
    in a case where the output-power limiting operation for decreasing grid frequency is performed, when at least one of the wind turbines is disconnected depending on wind conditions, output powers of other wind turbines in operation are increased.

2. The wind-power generation system according to claim 1, further comprising wind-condition forecast device for forecasting the wind conditions,
    wherein when at least one of the wind turbines is forecasted to receive wind having a wind speed higher than or equal to a preset first threshold value on a basis of a result of forecast by the wind-condition forecast device, the at least one of the wind turbines is disconnected.

3. The wind-power generation system according to claim 2, further comprising a central control unit for sending a control command to the plurality of wind turbines,
    wherein the central control unit is structured to output a disconnection command to the at least one of the wind turbines forecasted to receive the wind having the wind speed higher than or equal to the preset first threshold value, and to output an output-power command to other wind turbines maintaining an interconnection so as to compensate for an output power reduction due to disconnection of the at least one of the wind turbines.

4. The wind-power generation system according to claim 3, wherein the central control unit has first information in which a wind direction and wind turbine group to be disconnected are associated with each other, and
    the central control unit is structured to acquire the wind turbine group corresponding to the wind direction from the first information and to output the disconnection command to the acquired wind turbine group when the wind speed higher than or equal to the preset first threshold value is forecasted by the wind-condition forecast device.

5. The wind-power generation system according to claim 4, wherein the first information is generated on a basis of a past wind condition history.

6. The wind-power generation system according to claim 5, wherein the first information is updated at predetermined time intervals.

7. The wind-power generation system according to claim 3, wherein when disconnecting a plurality of the wind turbines, the central control unit is structured to disconnect the wind turbines one-by-one or a few at a time.

8. The wind-power generation system according to claim 3, wherein the at least one of the wind turbines that has received the disconnection command is structured to control blade pitch angle to a feather side for halting the operation.

9. The wind-power generation system according to claim 2, wherein if an average wind speed during a predetermined period after the disconnection is lower than or equal to a second threshold value that is set to be less than the preset first threshold value, the at least one of the wind turbines is restored, and the output powers of the other wind turbines that maintain the operation are decreased in cooperation with the restoring.

10. The wind-power generation system according to claim 2, wherein the wind speed that at least one of the wind turbines receives is forecasted on the basis of the result of forecast by the wind-condition forecast device, and
    if a forecasted wind speed is lower than or equal to a second threshold value that is set to be less than the preset first threshold value, the at least one of the wind turbines is restored, and the output powers of the other wind turbines that maintain the operation are decreased in cooperation with the restoring.

11. The wind-power generation system according to claim 2, wherein the preset first threshold value is set, on a basis of pitch angles and the output powers of the individual wind turbines, to a wind speed at which the rotational speed is forecasted to reach a preset upper-limit rotational speed.

12. A control method for a wind-power generation system including a plurality of wind turbines, in which an output power of the plurality of wind turbines is supplied to a utility grid through a common interconnection point,
    wherein the wind-power generation system is structured to operate in a normal operation and an output-power limiting operation in which a rotational speed of each of the plurality of wind turbines is higher than that in the normal operation, and
    in a case where the output-power limiting operation for decreasing a grid frequency is performed, when at least one of the wind turbines is disconnected depending on wind conditions, the output power of other wind turbines in operation is increased.

13. A control method for a wind-power generation system, comprising the steps of:
    providing a plurality of wind turbines in which an output power of individual wind turbines is supplied to a utility grid through a common interconnection point; and
    operating the wind-power generation system in a normal operation or an output-power limiting operation for decreasing a grid frequency in which a rotational speed of each of the wind turbines is higher than that in the normal operation;
    wherein when the output-power limiting operation is performed, at least one of the wind turbines forecasted to receive a wind having a wind speed higher than or equal to a preset first threshold value is disconnected, and output power of other wind turbines in operation is increased to compensate for an output power reduction due to a disconnection of the at least one of the wind turbines.

* * * * *